(12) United States Patent
Sakamaki

(10) Patent No.: US 11,190,099 B2
(45) Date of Patent: Nov. 30, 2021

(54) VOLTAGE CONVERSION DEVICE

(71) Applicant: CANON KABUSHIKI KAISHA, Tokyo (JP)

(72) Inventor: Takuya Sakamaki, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/797,150

(22) Filed: Feb. 21, 2020

(65) Prior Publication Data

US 2020/0280253 A1 Sep. 3, 2020

(30) Foreign Application Priority Data

Feb. 28, 2019 (JP) .............................. JP2019-036398

(51) Int. Cl.
*H02M 3/07* (2006.01)
*H02M 3/158* (2006.01)

(52) U.S. Cl.
CPC ......... *H02M 3/073* (2013.01); *H02M 3/1582* (2013.01); *H02M 3/072* (2021.05)

(58) Field of Classification Search
None
See application file for complete search history.

(56) References Cited

U.S. PATENT DOCUMENTS

| 7,612,603 | B1* | 11/2009 | Petricek | H02M 3/07 |
| | | | | 307/109 |
| 8,710,903 | B2* | 4/2014 | Oraw | G11C 5/147 |
| | | | | 327/530 |
| 10,447,152 | B2* | 10/2019 | Zhang | H02M 1/08 |
| 10,498,229 | B2* | 12/2019 | Solie | H02M 3/07 |
| 10,637,355 | B1* | 4/2020 | Shao | H02M 1/084 |
| 10,734,898 | B1* | 8/2020 | Arnold | H02M 3/158 |
| 10,811,959 | B1* | 10/2020 | Shao | H02M 7/483 |

FOREIGN PATENT DOCUMENTS

JP     2003-033009 A     1/2003

* cited by examiner

*Primary Examiner* — Jeffery S Zweizig
(74) *Attorney, Agent, or Firm* — Cowan, Liebowitz & Latman, P.C.

(57) ABSTRACT

A voltage conversion device that is operable as a switched capacitor, includes switches, a boost circuit that raises an input voltage to the voltage conversion device to a voltage that is higher than a predetermined reference voltage, and a control unit that controls states of the switches based on a voltage output from the boost circuit.

16 Claims, 1 Drawing Sheet

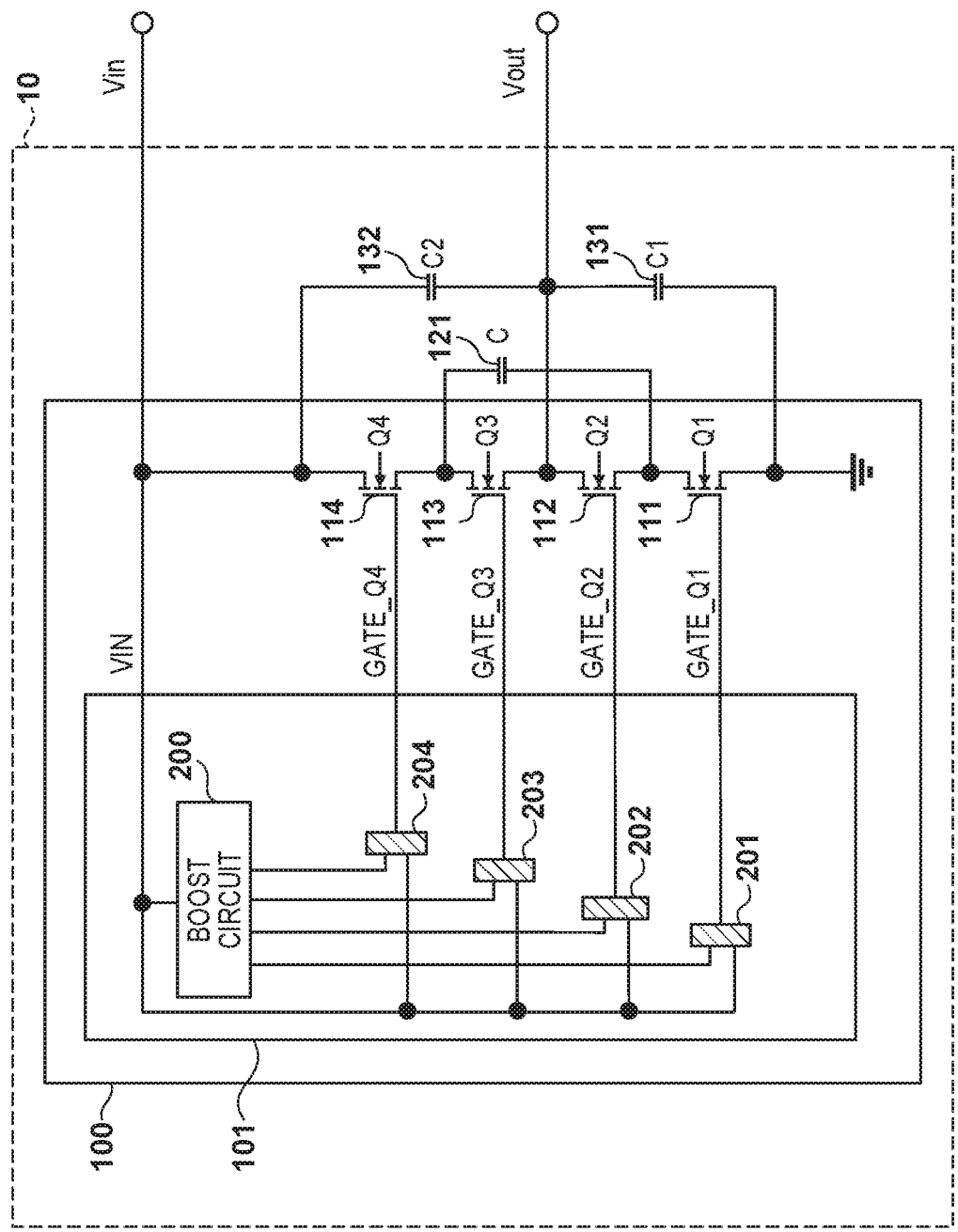

VOLTAGE CONVERSION DEVICE

BACKGROUND

Field of the Disclosure

Aspects of the disclosure generally relate to a voltage conversion device or the like that is operable as a switched capacitor.

Description of the Related Art

A voltage drop circuit 5 that is operable as a switched capacitor is described in Japanese Patent Laid-Open No. 2003-33009. Japanese Patent Laid-Open No. 2003-33009 describes converting an input voltage to a predetermined output voltage that is lower than the input voltage by controlling switches 47 and 49 included in the voltage drop circuit 5.

However, a problem that occurs when the input voltage to the voltage drop circuit 5 drops below a predetermined reference voltage (the lowest voltage needed to turn on the switch 47 or 49) is not considered in Japanese Patent Laid-Open No. 2003-33009. In such a case, although a control circuit unit 7 included in the voltage drop circuit 5 is operable with the input voltage to the voltage drop circuit 5, the control circuit unit 7 cannot perform control to turn on the switch 47 or 49. As a result, the voltage drop circuit 5 can no longer convert the input voltage to a predetermined output voltage (an output voltage at half the input voltage, for example).

SUMMARY

According to an aspect of the embodiments, even if an input voltage to a voltage conversion device that is operable as a switched capacitor has dropped below a predetermined reference voltage, the input voltage can be converted to a predetermined output voltage that is lower than the input voltage.

According to an aspect of the embodiments, there is provided a voltage conversion device that is operable as a switched capacitor, comprising: switches; a boost circuit that raises an input voltage to the voltage conversion device to a voltage that is higher than a predetermined reference voltage; and a control unit that controls states of the switches based on a voltage output from the boost circuit.

Further aspects of the embodiments will become apparent from the following embodiments.

BRIEF DESCRIPTION OF THE DRAWING

The FIGURE is a block diagram illustrating an example of a configuration of a voltage conversion device 10 in first and other embodiments.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

An example of a configuration of a voltage conversion device 10 in a first embodiment will be described with reference to the FIGURE. Note that the components of the voltage conversion device 10 are not limited to the components shown in the FIGURE. The voltage conversion device 10 is a voltage conversion device that is operable as a switched capacitor. The voltage conversion device 10 is also a voltage conversion device that operates as a capacitive voltage divider or a cap-divider. An input voltage Vin is an input voltage to the voltage conversion device 10, and an output voltage Vout is an output voltage of the voltage conversion device 10. The voltage conversion device 10 can convert the input voltage Vin to the output voltage Vout equivalent to one-nth (n is an integer from 2 to 20, for example) of the input voltage Vin. Note that a case in which n is 2 will be described in the first and other embodiments, but n is not limited to 2 in any embodiment.

As shown in the FIGURE, the voltage conversion device 10 includes an IC (Integrated Circuit) 100 and three capacitors 121, 131, and 132 that are connected to the IC 100. The IC 100 is constituted by one integrated circuit, for example. The three capacitors 121, 131, and 132 have the same capacitance, for example. Note that the three capacitors 121, 131, and 132 may be incorporated in the IC 100.

The IC 100 includes four switches 111 to 114, and a control unit 101 that controls the states of the four switches 111 to 114. The control unit 101 includes an input terminal VIN, a boost circuit 200, four output terminals GATE_Q1 to Q4, and four voltage selectors 201 to 204. The input voltage Vin, which is an input voltage to the voltage conversion device 10, is supplied to the input terminal VIN.

In order to turn on the switches 111 to 114, a control voltage Vgs to be supplied to gate electrodes of the switches 111 to 114 needs to be greater than or equal to (output voltage Vout+α) V. Here, α is a voltage that is determined by a process used when the IC 100 is manufactured, and in the first and other embodiments, a case where α is 2.5 is described, for example. Considering that the output voltage Vout is equal to half the input voltage Vin, and the input voltage to the control unit 101 is the input voltage Vin, the input voltage Vin needs to be greater than or equal to 5.0 V. When the input voltage Vin is greater than or equal to 5.0 V, if the input voltage Vin is used as the control voltage Vgs, and is supplied to the gate electrodes of the switches 111 to 114 from the control unit 101, the switches 111 to 114 can be turned on. However, if the input voltage Vin decreases below 5.0 V, even if the input voltage Vin is used as the control voltage Vgs, and is supplied to the gate electrodes of the switches 111 to 114 from the control unit 101, the switches 111 to 114 cannot be turned on. Therefore, in the first and other embodiments, a boost circuit 200 is provided in the IC 100.

The input voltage Vin is supplied to the boost circuit 200 as an input voltage to the boost circuit 200. The boost circuit 200 monitors the input voltage Vin, and determines whether or not the input voltage Vin is greater than or equal to a predetermined reference voltage (5.0 V, for example). If it is determined that the input voltage Vin is greater than or equal to the predetermined reference voltage, the boost circuit 200 supplies a voltage at 0 V or a voltage that is lower than the input voltage Vin to the voltage selectors 201 to 204 as the output voltage of the boost circuit 200. If it is determined that the input voltage Vin is less than the predetermined reference voltage, the boost circuit 200 raises the input voltage to the boost circuit 200 to a voltage that is greater than or equal to the predetermined reference voltage. The voltage, which is greater than or equal to the predetermined reference voltage, that is obtained by raising the input voltage to the boost circuit 200 is supplied to the voltage selectors 201 to 204 as the output voltage of the boost circuit 200. Note that, in the first and other embodiments, a case where the predetermined reference voltage is 5.0 V, for example, is described, but the predetermined reference voltage is not limited to 5.0 V.

The voltage selector 201 compares the input voltage Vin with the output voltage of the boost circuit 200. If the input voltage Vin is less than the output voltage of the boost circuit 200, the voltage selector 201 selects the output voltage of the boost circuit 200 as the control voltage Vgs. If the input voltage Vin is not less than the output voltage of the boost circuit 200, the voltage selector 201 selects the input voltage Vin as the control voltage Vgs. When the switch 111 is to be turned on, the control unit 101 supplies the control voltage Vgs to the gate electrode of the switch 111 from the voltage selector 201 via the output terminal GATE_Q1. When the switch 111 is to be turned off, the control unit 101 stops supplying the control voltage Vgs to the gate electrode of the switch 111 from the voltage selector 201 via the output terminal GATE_Q1. In this way, the control unit 101 can turn on or off the switch 111 by controlling whether or not the control voltage Vgs is to be supplied to the gate electrode of the switch 111 from the voltage selector 201.

The voltage selector 202 compares the input voltage Vin with the output voltage of the boost circuit 200. If the input voltage Vin is less than the output voltage of the boost circuit 200, the voltage selector 202 selects the output voltage of the boost circuit 200 as the control voltage Vgs. If the input voltage Vin is not less than the output voltage of the boost circuit 200, the voltage selector 202 selects the input voltage Vin as the control voltage Vgs. When the switch 112 is to be turned on, the control unit 101 supplies the control voltage Vgs to the gate electrode of the switch 112 from the voltage selector 202 via the output terminal GATE_Q2. When the switch 112 is to be turned off, the control unit 101 stops supplying the control voltage Vgs to the gate electrode of the switch 112 from the voltage selector 202 via the output terminal GATE_Q2. In this way, the control unit 101 can turn on or off the switch 112 by controlling whether or not the control voltage Vgs is to be supplied to the gate electrode of the switch 112 from the voltage selector 202.

The voltage selector 203 compares the input voltage Vin with the output voltage of the boost circuit 200. If the input voltage Vin is less than the output voltage of the boost circuit 200, the voltage selector 203 selects the output voltage of the boost circuit 200 as the control voltage Vgs. If the input voltage Vin is not less than the output voltage of the boost circuit 200, the voltage selector 203 selects the input voltage Vin as the control voltage Vgs. When the switch 113 is to be turned on, the control unit 101 supplies the control voltage Vgs to the gate electrode of the switch 113 from the voltage selector 203 via the output terminal GATE_Q3. When the switch 113 is to be turned off, the control unit 101 stops supplying the control voltage Vgs to the gate electrode of the switch 113 from the voltage selector 203 via the output terminal GATE_Q3. In this way, the control unit 101 can turn on or off the switch 113 by controlling whether or not the control voltage Vgs is to be supplied to the gate electrode of the switch 113 from the voltage selector 203.

The voltage selector 204 compares the input voltage Vin with the output voltage of the boost circuit 200. If the input voltage Vin is less than the output voltage of the boost circuit 200, the voltage selector 204 selects the output voltage of the boost circuit 200 as the control voltage Vgs. If the input voltage Vin is not less than the output voltage of the boost circuit 200, the voltage selector 204 selects the input voltage Vin as the control voltage Vgs. When the switch 114 is to be turned on, the control unit 101 supplies the control voltage Vgs to the gate electrode of the switch 114 from the voltage selector 204 via the output terminal GATE_Q4. When the switch 114 is to be turned off, the control unit 101 stops supplying the control voltage Vgs to the gate electrode of the switch 114 from the voltage selector 204 via the output terminal GATE_Q4. In this way, the control unit 101 can turn on or off the switch 114 by controlling whether or not the control voltage Vgs is to be supplied to the gate electrode of the switch 114 from the voltage selector 204.

When the input voltage Vin is input to the control unit 101, the control unit 101 controls whether or not the control voltage Vgs is to be supplied to the gate electrodes of the switches 111 to 114. With this control, the control unit 101 turns on the switches 113 and 111, and turns off the switches 114 and 112. Note that the state of the IC 100 in which the switches 113 and 111 are in an ON state, and the switches 114 and 112 are in an OFF state is referred to as a "state A". With this, the capacitors 121 and 132 are connected in series, and as a result, the output voltage Vout is a voltage obtained by voltage-dividing the input voltage Vin to half of the input voltage Vin. Here, the capacitor 131 smooths the output voltage Vout.

Next, the control unit 101 inverts the states of the switches 111 to 114 by controlling whether or not the control voltage Vgs is to be supplied to the gate electrodes of the switches 111 to 114. For example, the control unit 101 turns off the switches 113 and 111, and turns on the switches 114 and 112. Note that the state of the IC 100 in which the switches 113 and 111 are in an OFF state, and the switches 114 and 112 are in an ON state is referred to as a "state B". With this, the capacitors 121 and 132 are connected in parallel, and as a result, the output voltage Vout is a voltage obtained by voltage-dividing the input voltage Vin to half of the input voltage Vin. Here, the capacitor 131 also smooths the output voltage Vout.

Thereafter, the control unit 101 repeats inversion of the states of the switches 111 to 114 at a high speed by controlling, at a high speed, whether or not the control voltage Vgs is to be supplied to the gate electrodes of the switches 111 to 114. In this way, the control unit 101 can alternatingly switch, at a high speed, the state of the IC 100 between the "state A" and the "state B" by controlling, at a high speed, whether or not the control voltage Vgs is to be supplied to the gate electrodes of the switches 111 to 114. As a result of the control unit 101 controlling the states of the switches 111 to 114, the state of connection between the capacitors 121 and 132 is changed to a series connection or to a parallel connection. Also, as a result of changing the state of connection between the capacitors 121 and 132 to a series connection or to a parallel connection, the voltage conversion device 10 can output the output voltage Vout, which is half of the input voltage Vin.

As described above, according to the first embodiment, as a result of providing the boost circuit 200 in the IC 100, even if the input voltage Vin has dropped to a voltage that is lower than the predetermined reference voltage, the switches 111 to 114 can be stably controlled. With this, even if the input voltage Vin has dropped to a voltage that is lower than the predetermined reference voltage, the voltage conversion device 10 can convert the input voltage Vin to a predetermined output voltage (half of the input voltage Vin, for example) that is lower than the input voltage Vin.

Second Embodiment

Next, an example of a configuration of a voltage conversion device 10 in a second embodiment will be described. In the second embodiment, portions that are different from the first embodiment will be described, and the description of the portions that are similar to those of the first embodiment will be omitted.

In the second embodiment, a boost circuit 200 is constituted by a charge pump that does not use inductors. Also, the boost circuit 200 supplies, to the voltage selectors 201 to 204, a voltage that is two times of an input voltage Vin and is obtained by raising the input voltage Vin as the output voltage of the boost circuit 200. As a result of configuring in this way, the input voltage Vin can be converted to a predetermined output voltage that is lower than the input voltage Vin while retaining an advantage that, even if the input voltage Vin has decreased below a predetermined reference voltage (5.0 V, for example), magnetic noise will not be generated. Here, the predetermined output voltage is half of the input voltage Vin, for example.

Note that, when the input voltage Vin has further decreased from 5.0 V to 1.6 V, for example, even if the input voltage Vin is raised to a voltage that is two times of the input voltage Vin, the raised voltage is not greater than or equal to a predetermined reference voltage (5.0 V, for example). In this case, (Vin×2) V is smaller than (Vout+2.5) V. In such a case, the boost circuit 200 performs adjustment such that the raised voltage obtained by raising the input voltage Vin is greater than or equal to a predetermined reference voltage (5.0 V, for example), by changing the boosting ratio from two to X (X is an integer from 3 to 20).

As described above, according to the second embodiment, as a result of configuring the boost circuit 200 by a charge pump that does not use inductors, the input voltage Vin can be converted to a predetermined output voltage that is lower than the input voltage Vin while retaining an advantage that magnetic noise will not be generated.

Third Embodiment

Next, an example of a configuration of a voltage conversion device 10 in a third embodiment will be described. In the third embodiment, portions that are different from the first or second embodiment will be described, and the description of the portions that are similar to those of the first or second embodiment will be omitted.

If the switches 111 to 114 are controlled with a control voltage Vgs that is higher than that in a predetermined operating condition when the switches 111 to 114 are controlled to an ON state, although the loss of an IC 100 increases, the ON resistances of the switches 111 to 114 decrease. In this case, the voltage drop due to the switches 111 to 114 decreases, and the quality of the output voltage of the voltage conversion device 10 improves. Therefore, in an operating condition of an electronic device that requires a high-quality power supply, the switches 111 to 114 are controlled with the control voltage Vgs that is higher than that in a predetermined operating condition, by giving an instruction to a control unit 101 from an unshown microcontroller or the like.

For example, consider a case where an electronic device including the voltage conversion device 10 is an image capture apparatus such as a digital camera, and the voltage generated by the voltage conversion device 10 is supplied to an image sensor. When the image capture apparatus performs an image-capturing operation, the voltage to be supplied to the image sensor needs to be high quality, and therefore the switches 111 to 114 are to be controlled with the control voltage Vgs that is higher than that in a predetermined operating condition (other than the image-capturing operation, for example) until the image-capturing operation of the image capture apparatus is completed.

On the other hand, in a live view operation in which images obtained by the image sensor are displayed in a display unit such as an LCD, the images are not actually to be saved in a recording medium such as a memory card, and therefore a high quality output voltage is not required relative to a case of performing an image-capturing operation. In this case, the boosting ratio of a boost circuit 200 is reduced, and the switches 111 to 114 are controlled with a normal control voltage Vgs.

As described above, according to the third embodiment, as a result of controlling the magnitude of the control voltage Vgs according to the operating condition of an electronic device including the voltage conversion device 10, the voltage conversion device 10 can be used properly as a high-quality power supply or a highly-efficient power supply.

Fourth Embodiment

Next, an example of a configuration of a voltage conversion device 10 in a fourth embodiment will be described. In the fourth embodiment, portions that are different from the first, second, or third embodiment will be described, and the description of the portions that are similar to those of the first, second, or third embodiment will be omitted.

In the fourth embodiment, a case will be described where a control unit 101 is provided with boost circuits 200, and control voltages Vgs to be supplied to respective switches 111 to 114 are separately controlled. As a result of the control unit 101 being provided with the boost circuits 200, the switches 111 to 114 can be appropriately turned on or off, separately.

Fifth Embodiment

Various kinds of functions, processes, or methods described in the first to fourth embodiments can also be realized by a personal computer, a microcomputer, a CPU (Central Processing Unit), or the like with a program. In a fifth embodiment, a personal computer, a microcomputer, a CPU, or the like will be called a "computer X" below. Also, in the fifth embodiment, a program for controlling the computer X and realizing various kinds of functions, processes, or methods described in the first to fourth embodiments will be called a "program Y".

Various kinds of functions, processes, or methods described in the first to fourth embodiments are realized by the computer X executing the program Y. In this case, the program Y is supplied to the computer X via a computer-readable storage medium. The computer-readable storage medium according to the fifth embodiment includes at least one of a hard disk device, a magnetic storage device, an optical storage device, a magneto-optical storage device, a memory card, a volatile memory (e.g., random access memory), a non-volatile memory (e.g., read only memory), or the like. The computer-readable storage medium according to the fifth embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2019-036398, filed Feb. 28, 2019, which is hereby incorporated by reference herein in its entirety.

What is claimed is:

1. A voltage conversion device that is operable as a switched capacitor, comprising:
   switches that are used to convert an input voltage of the voltage conversion device to an output voltage that is lower than the input voltage;
   a boost circuit that raises the input voltage to a voltage that is higher than a predetermined reference voltage, in a case where the input voltage is less than the predetermined reference voltage; and
   a control unit that controls states of the switches by selectively providing one of the input voltage or a voltage output from the boost circuit to the respective switches.

2. The voltage conversion device according to claim 1, wherein the boost circuit monitors the input voltage and determines whether or not the input voltage is not less than the predetermined reference voltage.

3. The voltage conversion device according to claim 1, wherein the boost circuit comprises a charge pump.

4. The voltage conversion device according to claim 1, wherein the boost circuit outputs a voltage that is lower than the input voltage, in a case where the input voltage is not less than the predetermined reference voltage.

5. The voltage conversion device according to claim 1, wherein the voltage output from the boost circuit is provided to the respective switches in a case where the input voltage is less than the voltage output from the boost circuit, and the input voltage is provided to the respective switches in a case where the input voltage is not less than the voltage output from the boost circuit.

6. The voltage conversion device according to claim 1, wherein the switches, the boost circuit, and the control unit are comprised in one integrated circuit.

7. The voltage conversion device according to claim 1, wherein the voltage conversion device is comprised in an image capture apparatus.

8. The voltage conversion device according to claim 1, wherein the electronic device is comprised in a digital camera.

9. A method of controlling switches included in a voltage conversion device that is operable as a switched capacitor, the switches being used to convert an input voltage of the voltage conversion device to an output voltage that is lower than the input voltage, the method comprising:
   causing a boost circuit to raise an input voltage of the voltage conversion device to a voltage that is higher than a predetermined reference voltage, in a case where the input voltage is less than the predetermined reference voltage; and
   controlling states of the switches by selectively providing one of the input voltage or a voltage output from the boost circuit to the respective switches.

10. The method according to claim 9, wherein the boost circuit monitors the input voltage and determines whether or not the input voltage is not less than the predetermined reference voltage.

11. The method according to claim 9, wherein the boost circuit comprises a charge pump.

12. The method according to claim 9, further comprising causing the boost circuit to output a voltage that is lower than the input voltage, in a case where the input voltage is not less than the predetermined reference voltage.

13. The method according to claim 9, wherein the voltage output from the boost circuit is provided to the respective switches in a case where the input voltage is less than the voltage output from the boost circuit, and the input voltage is provided to the respective switches in a case where the input voltage is not less than the voltage output from the boost circuit.

14. The method according to claim 9, wherein the switches and the boost circuit are comprised in one integrated circuit.

15. The method according to claim 9, wherein the voltage conversion device is comprised in an image capture apparatus.

16. The method according to claim 9, wherein the electronic device is comprised in a digital camera.

* * * * *